(12) United States Patent
Lin et al.

(10) Patent No.: US 7,458,857 B2
(45) Date of Patent: Dec. 2, 2008

(54) ELECTRONIC DEVICE AND CARD-RECEIVING DEVICE THEREOF

(75) Inventors: Jin-Jong Lin, Taipei (TW); Wen-Kuei Lo, Taipei (TW)

(73) Assignee: Wistron NeWeb Corp., Taipei Hsien (TW)

( * ) Notice: Subject to any disclaimer, the term of this patent is extended or adjusted under 35 U.S.C. 154(b) by 0 days.

(21) Appl. No.: 11/637,515

(22) Filed: Dec. 11, 2006

(65) Prior Publication Data

US 2007/0173124 A1 Jul. 26, 2007

(51) Int. Cl.
*H01R 24/00* (2006.01)
(52) U.S. Cl. ...................................... 439/630
(58) Field of Classification Search ................. 439/630, 439/159, 326, 188, 299
See application file for complete search history.

(56) References Cited

U.S. PATENT DOCUMENTS 6,035,216 A  3/2000 Cheng et al.
6,382,995 B1 *  5/2002 Bricaud et al. .............. 439/159
6,602,096 B1 *  8/2003 Kronestedt et al. .......... 439/630
7,011,537 B1 *  3/2006 Wu ............................ 439/159
7,131,871 B1 * 11/2006 Zuo et al. ................... 439/630

FOREIGN PATENT DOCUMENTS

| CN | 1231556 A | 11/2004 |
| FI | 000679002 | * 10/1995 |
| TW | 542439 | 7/2003 |
| TW | M274670 | 9/2005 |

\* cited by examiner

*Primary Examiner*—Alexander Gilman
(74) *Attorney, Agent, or Firm*—Quintero Law Office (57) ABSTRACT

A card-receiving device for containing a card comprises a chassis, a tray and a stopper. The tray is disposed on the chassis and moveable between a first position and a second position, wherein the card is disposed on the tray, and moves from the first position to the second position by the tray. When the tray moves to the second position from the first position, the stopper abuts and stops the card.

16 Claims, 11 Drawing Sheets

ELECTRONIC DEVICE AND CARD-RECEIVING DEVICE THEREOF

BACKGROUND OF THE INVENTION

1. Field of the Invention

The invention relates to a card-receiving device, and in particular to a card-receiving device utilized in a portable electronic device.

2. Description of the Related Art

Figure 1:
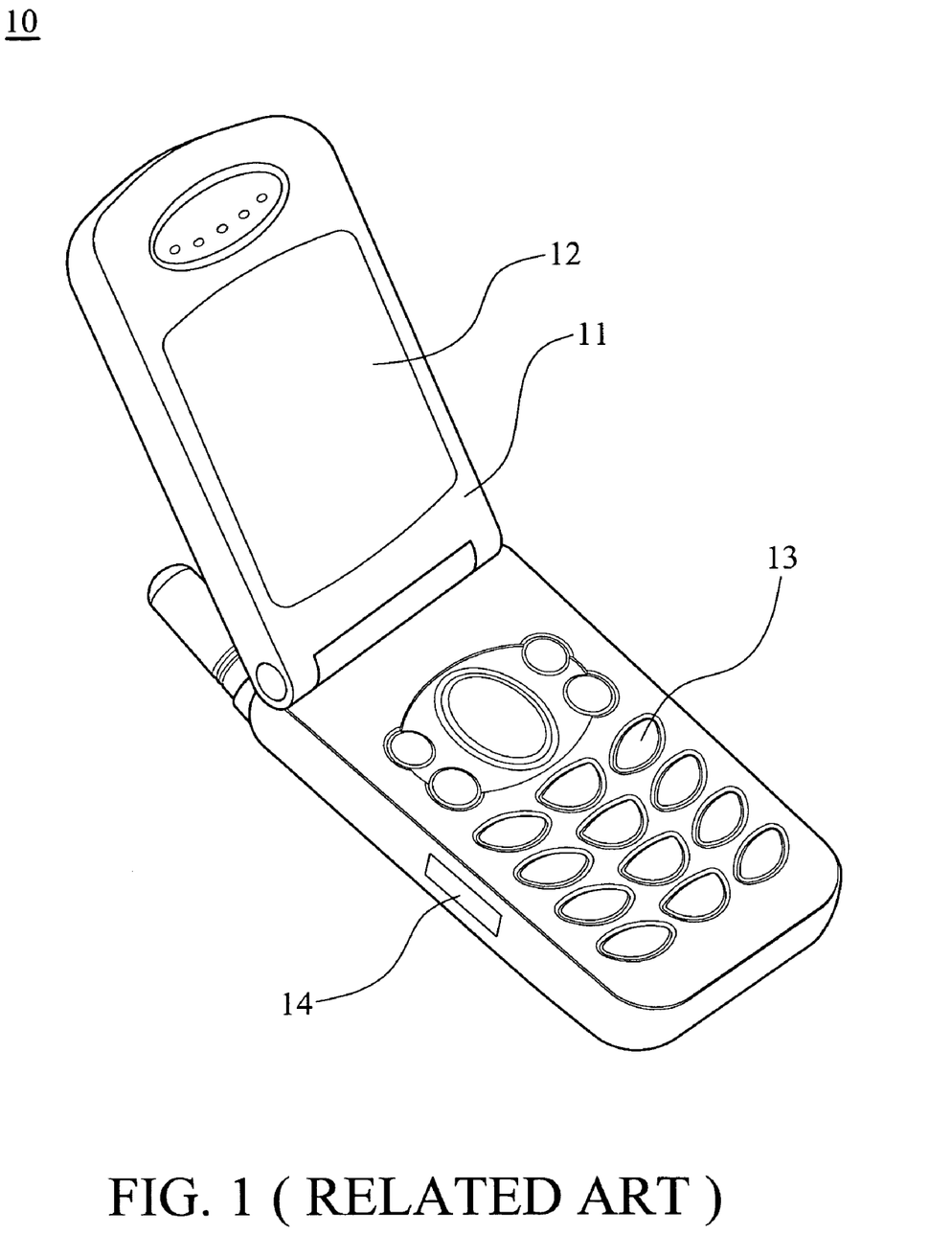
FIG. 1 shows a conventional dual mode mobile phone.

FIG. 1 shows a conventional mobile phone 10 comprising a housing 11, a display 12, a control interface 13 and an opening 14. The opening 14 is formed on a lateral surface of the mobile phone 10, and a subscriber identity module card (SIM card) is inserted therein. U.S. Pat. No. 6,602,096 discloses a card-receiving device for containing SIM cards. However, the SIM card and entire card-receiving device must be removed simultaneously to swap the SIM card, with the SIM card difficult to remove, and easily dropped and damaged.

BRIEF SUMMARY OF THE INVENTION

A detailed description is given in the following embodiments with reference to the accompanying drawings.

The invention provides a card-receiving device for a card, comprising a chassis, a tray and a stopper. The tray is disposed on the chassis, moveable between a first position and a second position, wherein the card is disposed on the tray, and moves from the first position to the second position with the tray. When the tray moves to the second position from the first position, the stopper abuts and stops the card.

The invention facilitates easier SIM card swap, and increases the convenience of the mobile phone. Additionally, the SIM card is prevented from dropping during removal.

BRIEF DESCRIPTION OF THE DRAWINGS

The invention can be more fully understood by reading the subsequent detailed description and examples with references made to the accompanying drawings, wherein:

FIG. 7b is an assembly view of the embodiment in FIG. 7a.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
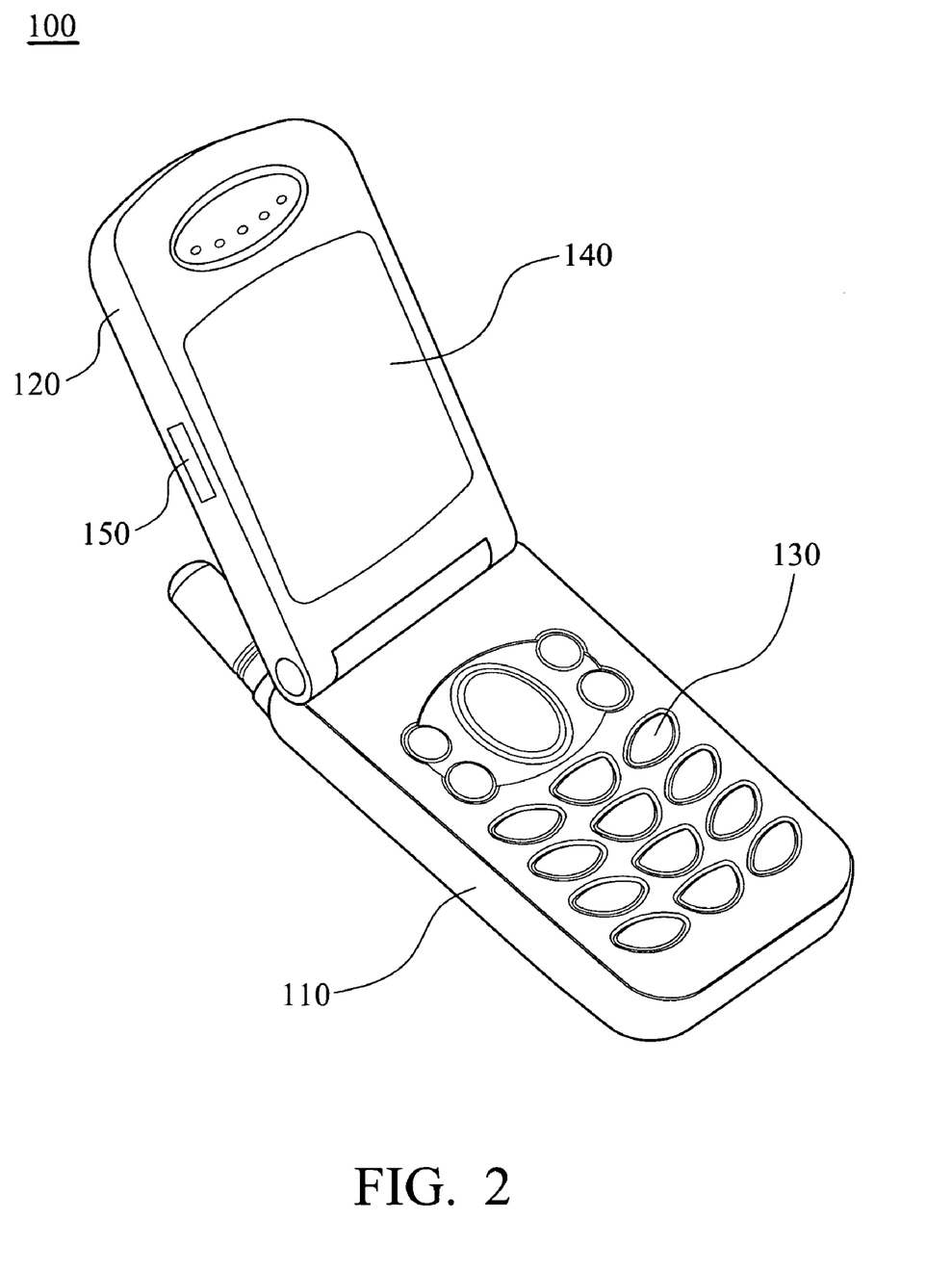
FIG. 2 shows an electronic device of the invention.

FIG. 2 shows a mobile phone 100 (electronic device) of the invention, comprising a body 110 and a cover 120. The cover 120 pivots on the body 100. The body 110 comprises a control interface 130 disposed thereon. The cover 120 comprises a display 140 and an opening 150 disposed thereon.

Figure 3:
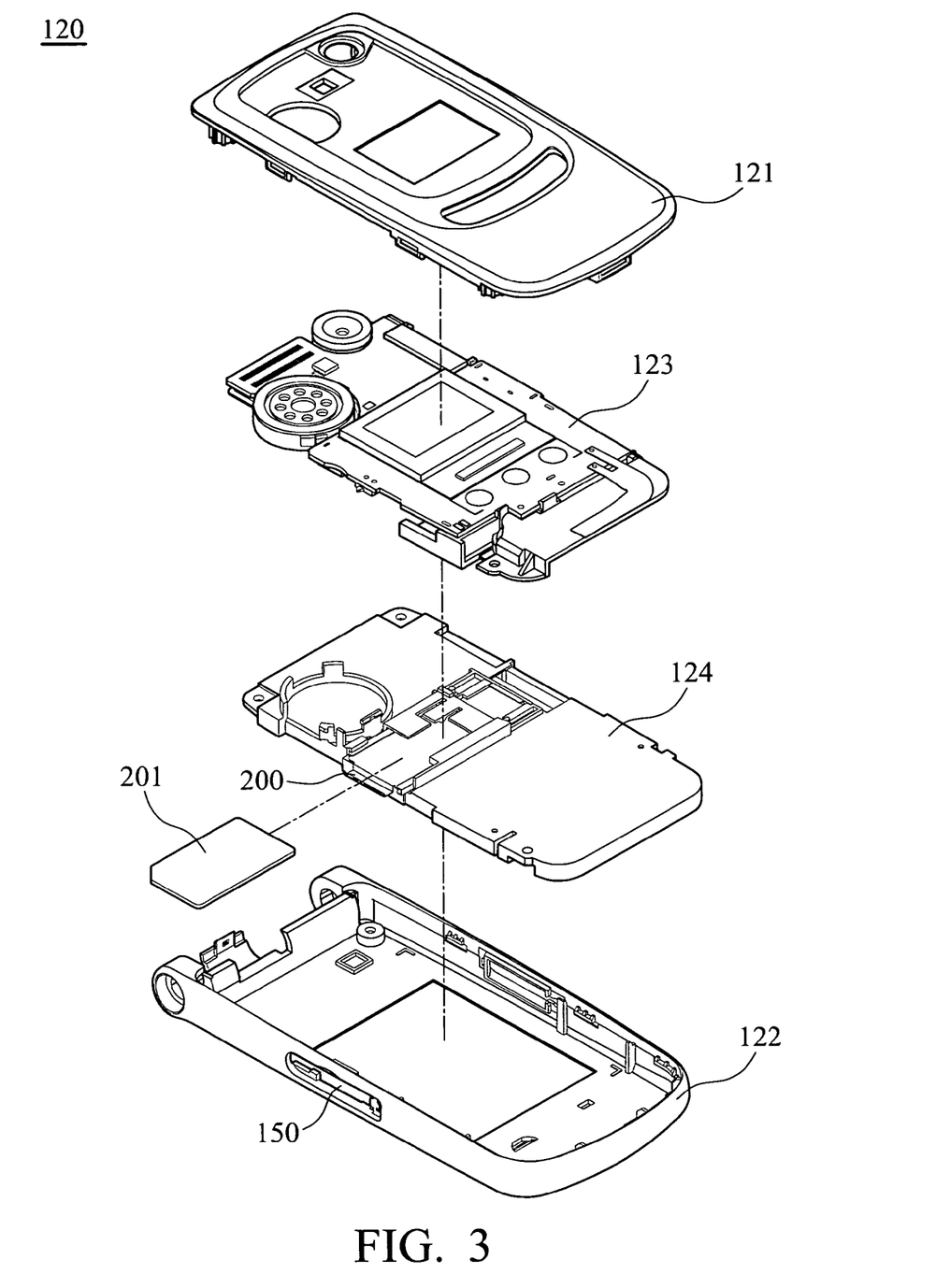
FIG. 3 shows an inner structure of the cover of the invention.

FIG. 3 shows an inner structure of the cover 120 of the invention. The cover 120 comprises a first housing 121, a second housing 122, a chassis 124, a circuit board 123, a card-receiving device 200, the display 140 (with reference to FIG. 2) and a SIM card (card) 201. The chassis 124, the circuit board 123, the card-receiving device 200 and the display 140 are disposed between the first housing 121 and the second housing 122. The card-receiving device 200 corresponds to the opening 150. The circuit board 123, the card-receiving device 200 and the display 140 are disposed on the chassis 124. The SIM card 201 is disposed in the card-receiving device 200.

Figure 4:
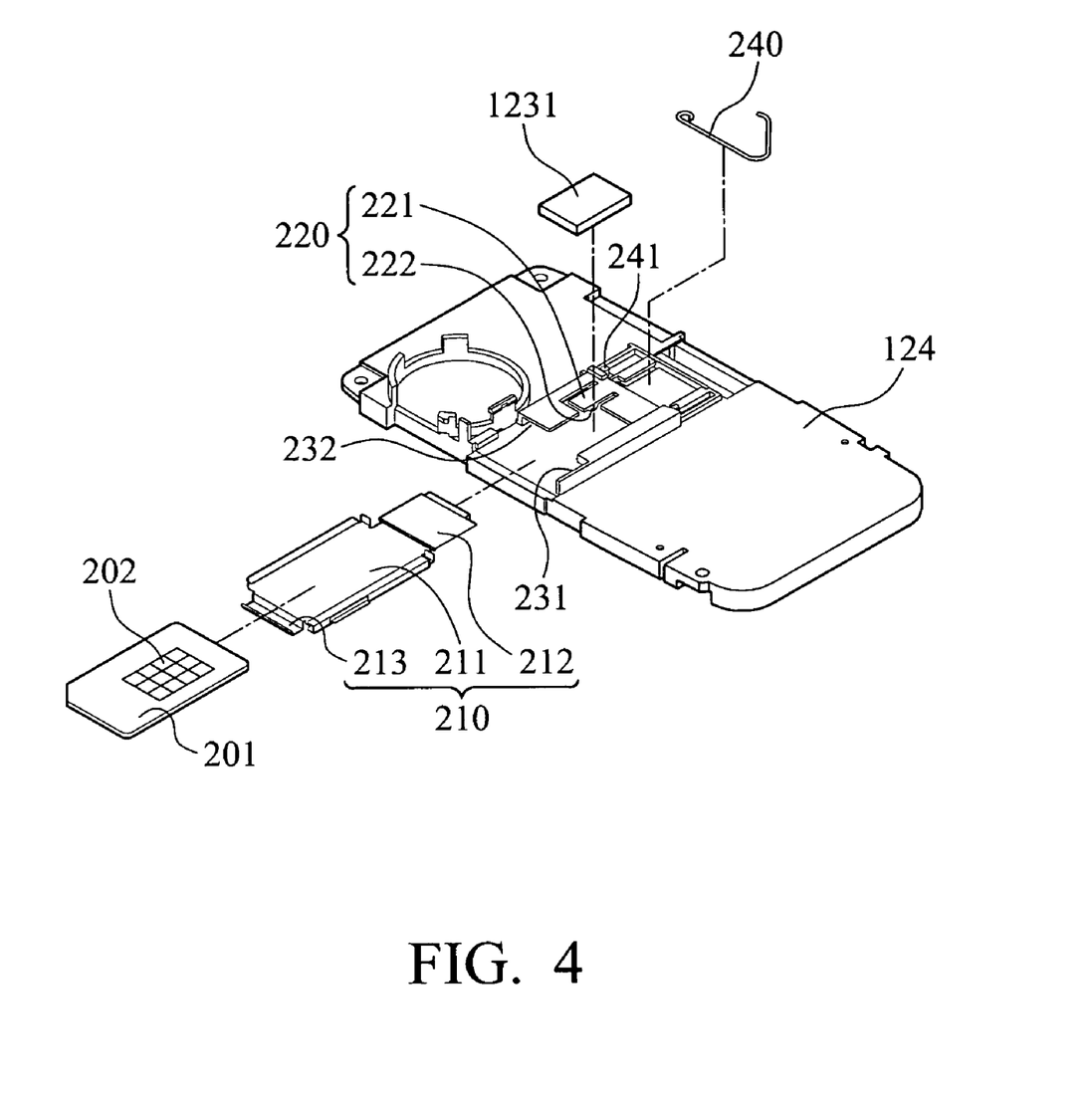
FIG. 4 is an exploded view of a chassis and a card-receiving device of the invention.

FIG. 4 is an exploded view of the chassis and the card-receiving device. The card-receiving device comprises a tray 210, a stopper 220, a resilient member 240 and guide grooves 231 and 232. The tray 210 comprises a base 211, an abutting portion 212 and a holding portion 213. The base 211 is planar, the abutting portion 212 is disposed on a first side thereof, the holding portion 213 is disposed on a second side thereof, and the first side is opposite to the second side. The SIM card 201 is supported by the base 211 comprising a conductive portion 202. The stopper 220 is formed on the chassis 124, comprising a cantilever beam 221 and a stopping portion 222. The stopping portion 222 is formed on an end of the cantilever beam 221. A first end of the resilient member 240 is connected to the chassis 124, and a second end thereof abuts the abutting portion 212. A connecting portion 241 is formed on the chassis 124 connecting the resilient member 240. A coupling portion 1231 is disposed on the circuit board 123 (with reference to FIG. 3) corresponding to the SIM card 201.

Figure 5A:
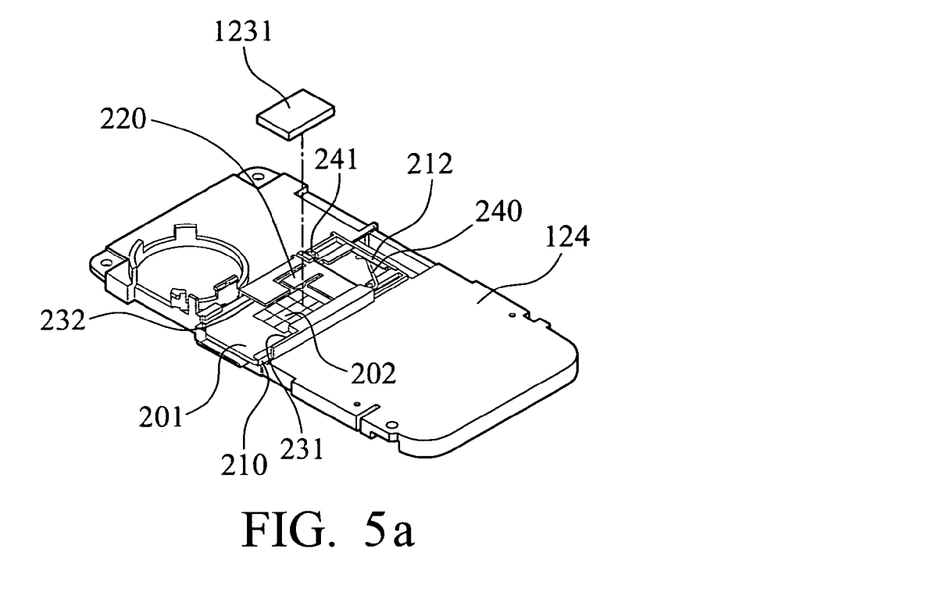
FIG. 5a is an assembly view of the chassis and the card-receiving device of the invention.

FIG. 5a is an assembly view of the chassis and the card-receiving device, wherein the tray 210 and the SIM card 201 are in a second position. An end of the resilient member 240 is connected to the connecting portion 241, and another end thereof abuts the abutting portion 212. The coupling portion 1231 corresponds to the conductive portion 202 to couple the SIM card 201 and the circuit board (not shown).

Figure 5B:
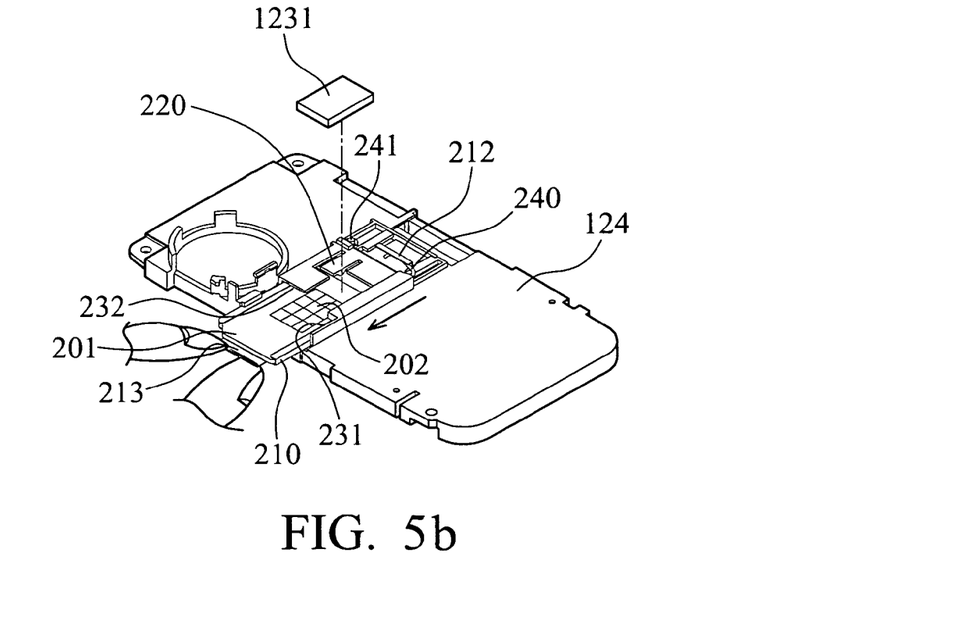
FIG. 5b shows a tray in a first position.

With reference to FIG. 5b, during removal of the SIM card 201, the holding portion 213 moves the tray 210 and the SIM card 201 to a first position. Simultaneously, the abutting portion 212 pushes the resilient member 240, which is deformed to provide a recovery force (elastic force).

Figure 5C:
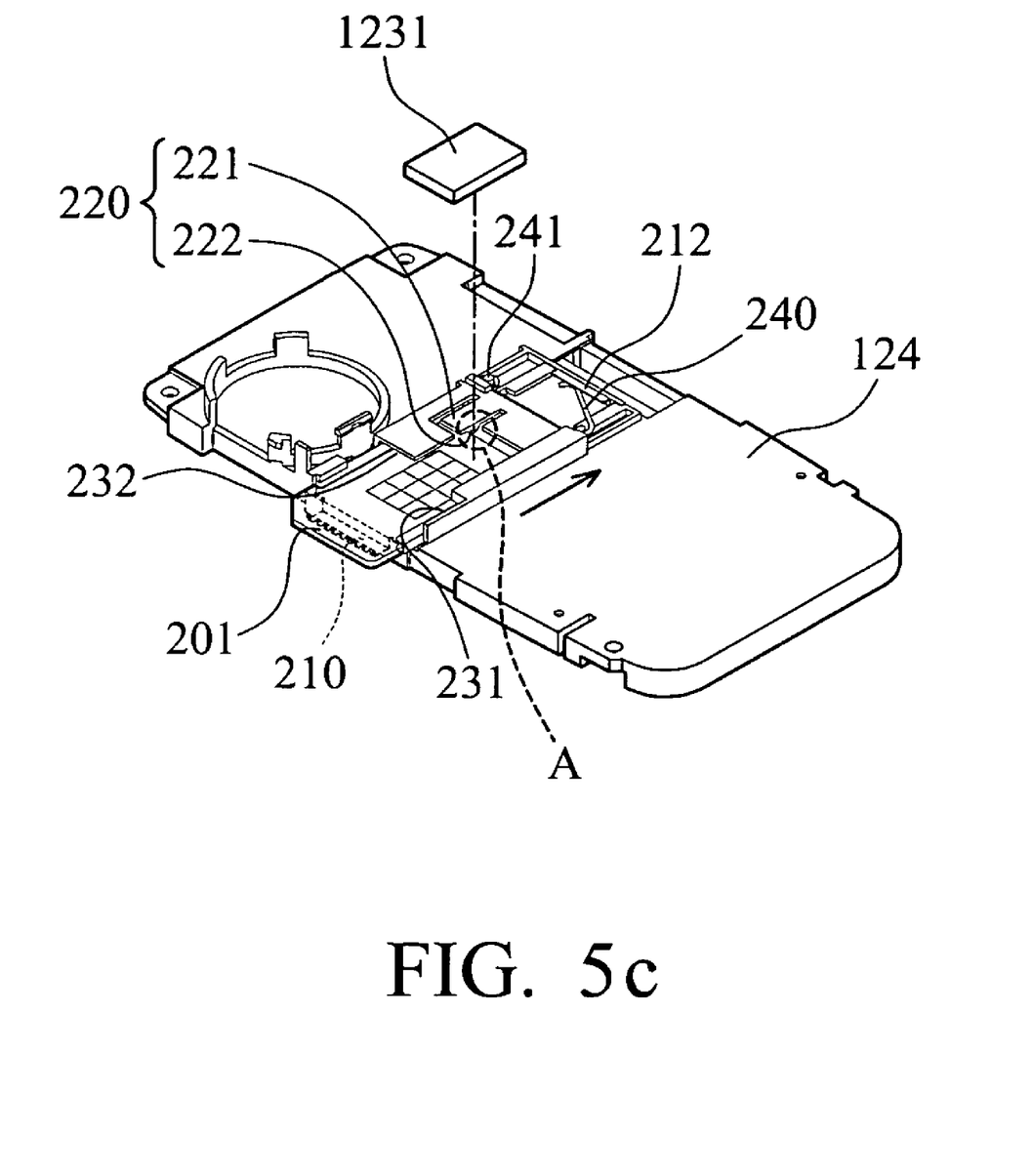
FIG. 5c shows a SIM card stopped by a stopper.
Figure 5D:
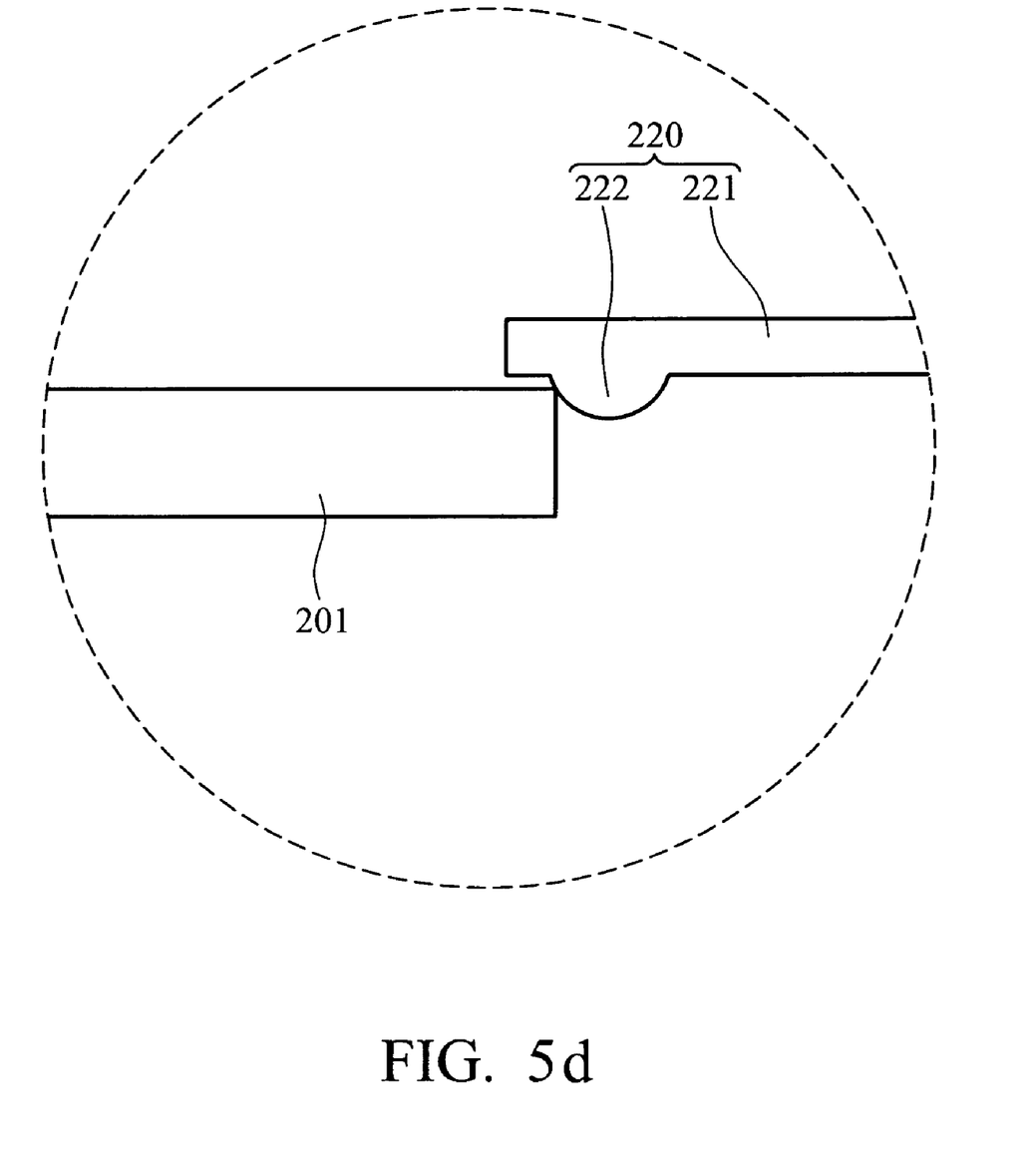
FIG. 5d is an enlarged view of portion A of FIG. 5c.
Figure 6:
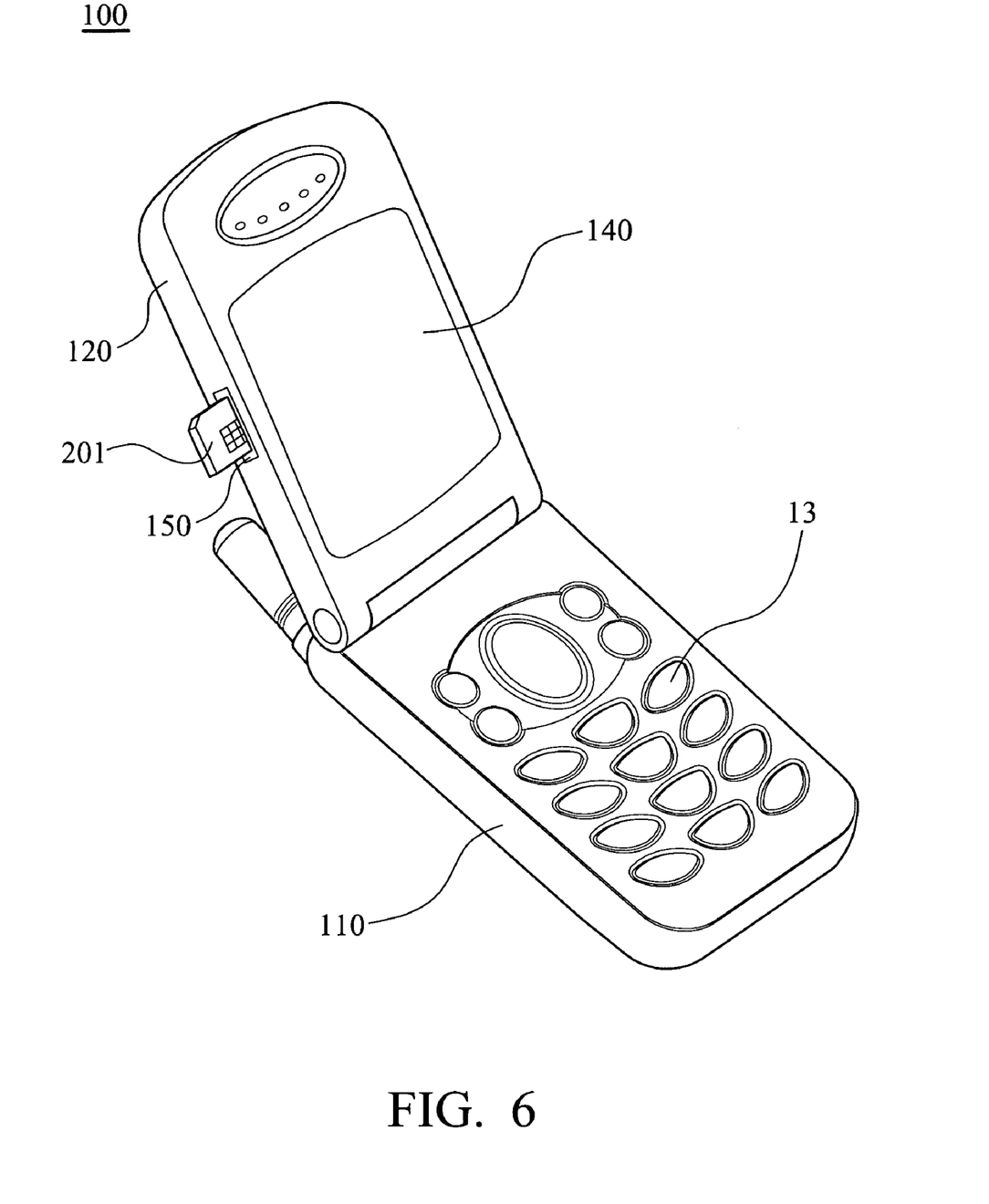
FIG. 6 shows the SIM card partially removed through of the opening.

With reference to FIG. 5c, after the tray 210 is released, the resilient member 240 pushes the tray 210 to the second position by the recovery force. Simultaneously, the SIM card 201 moves toward the second position, stopped by the stopping portion 222 of the stopper 220 (with reference to FIG. 5d, which is an enlarged view of portion A of FIG. 5c), and partially ejected from the opening 150 (with reference to FIG. 6). Thus, the SIM card can be easily removed from the opening 150.

Figure 5E:
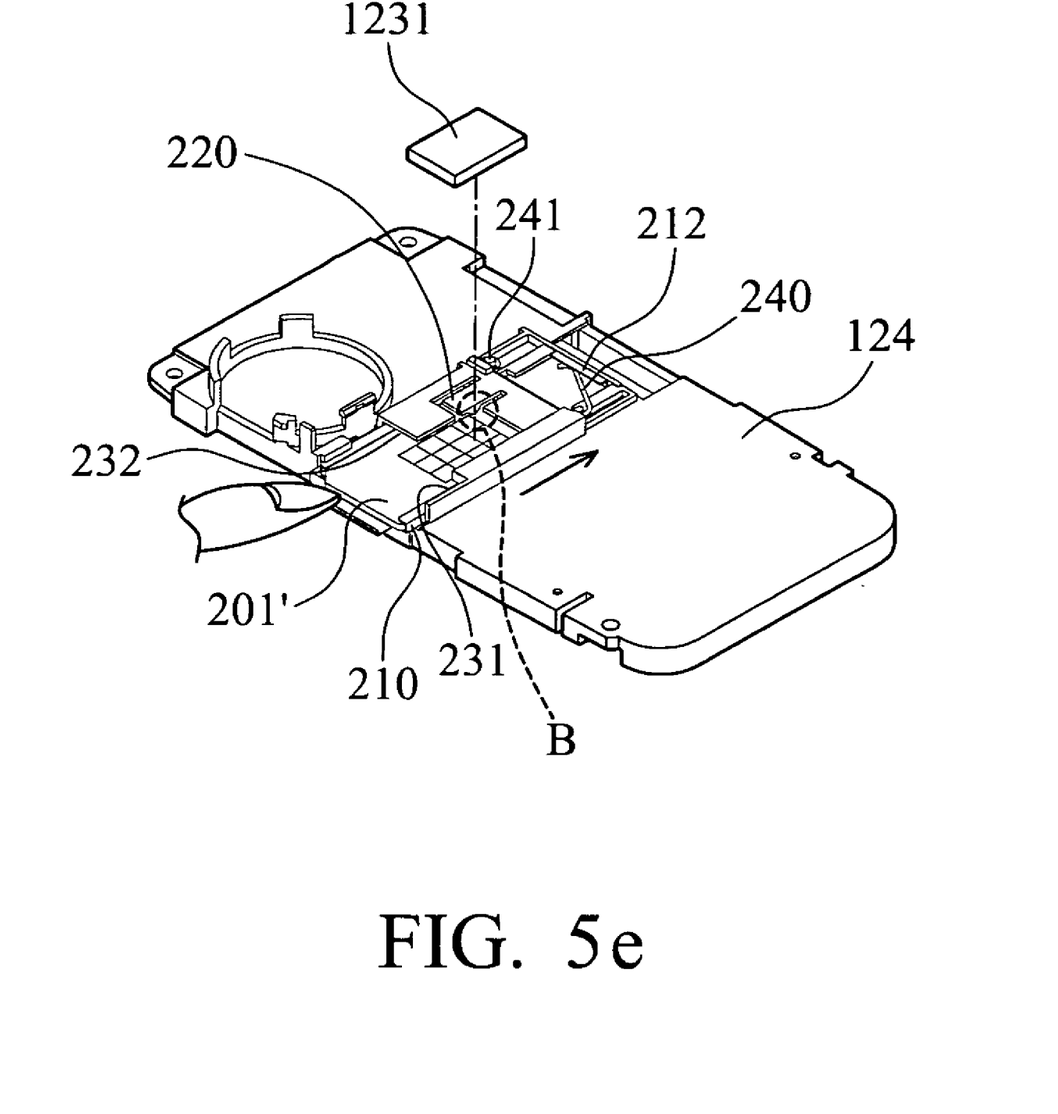
FIG. 5e shows the SIM card pushed into an opening.
Figure 5F:
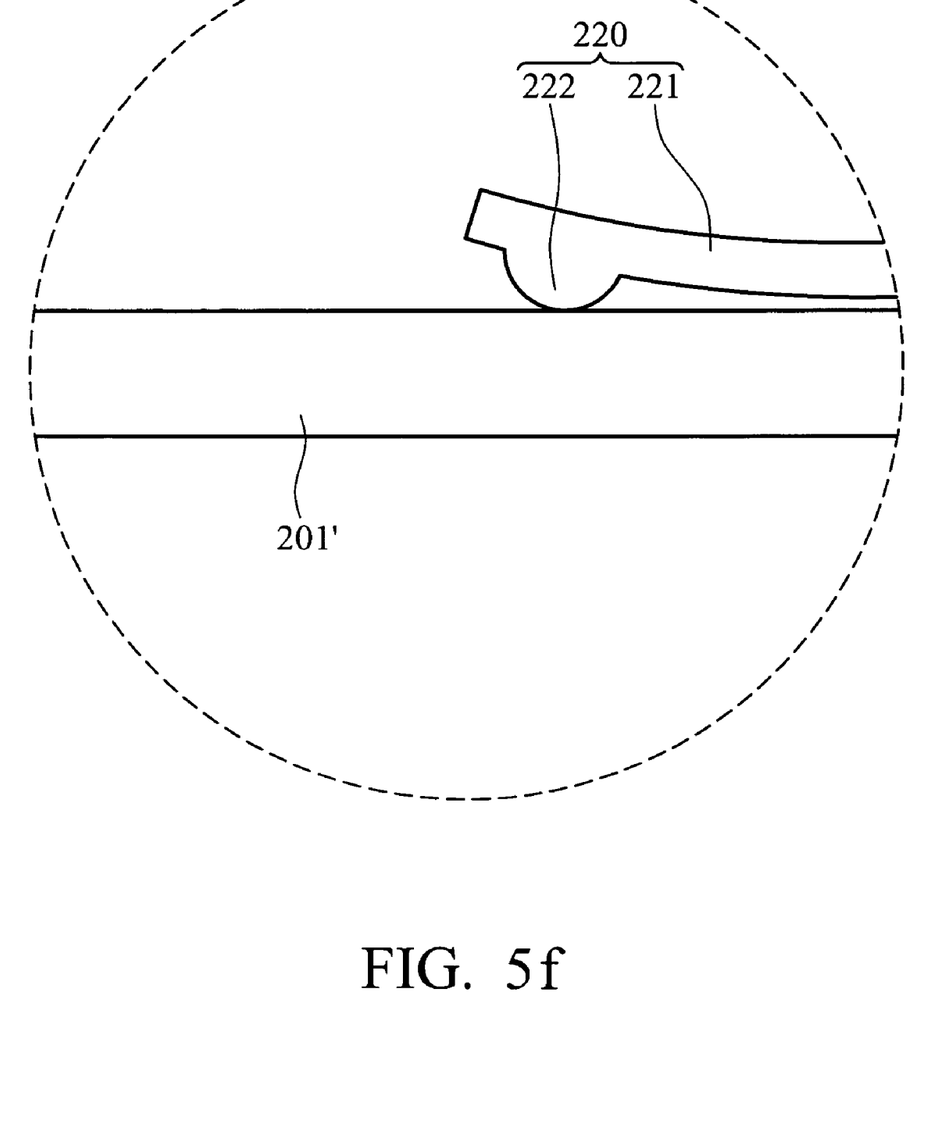
FIG. 5f is an enlarged view of portion B of FIG. 5e.

After the SIM card 201 is removed from the opening 150, another SIM card 201' is inserted into the opening 150 and pushed to the second position (with reference to FIG. 5e). FIG. 5f is an enlarged view of portion B of FIG. 5e, wherein when the SIM card 201' is inserted, the insertion force overcomes the resistance of the stopper 220, and the cantilever beam 221 deforms upward. Thus, the SIM card 201' can be pushed to the second position.

In the embodiment of the invention, the resilient member is a metal stick disposed between the chassis and the tray, wherein when the tray moves to the second position, the metal stick is compressed and bended for storing elastic force. However, the invention is not limited. The resilient member can be selected from other types of springs.

The invention provides easier SIM card swap, and increases the convenience of the mobile phone. Additionally, the SIM card is prevented from dropping during removal.

The card-receiving device of the invention can be utilized with other cards, such as memory cards. Additionally, the card-receiving device can be disposed in a personal digital assistant (PDA) or a notebook.

Figure 7A:
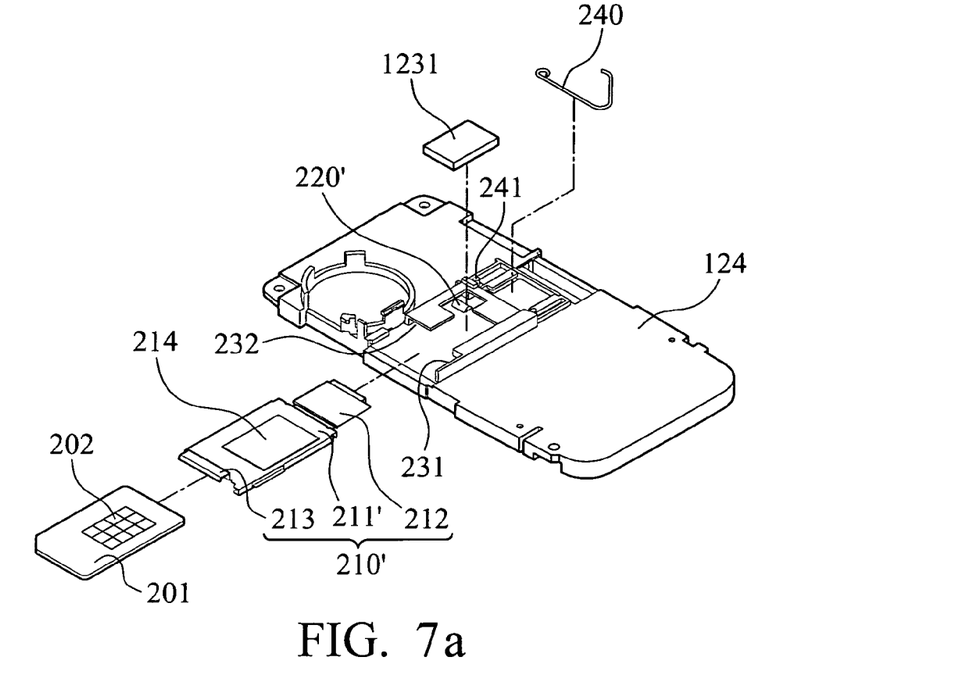
FIG. 7a is an exploded view of a modified embodiment of the invention.

In the embodiment described, the SIM card 201 is disposed between the base 211 and the circuit board. However, FIG. 7a shows a modified embodiment of the invention, wherein the base 211' is between the SIM card 201 and the circuit board. The base 211' comprises a through hole 214. The chassis 124 comprises a stopper 220' for stopping the SIM card 201. When the SIM card 201 is moved toward the second position with the tray 210', the SIM card 201 is stopped by the stopper 220' and partially ejected from the opening 150.

Figure 7B:
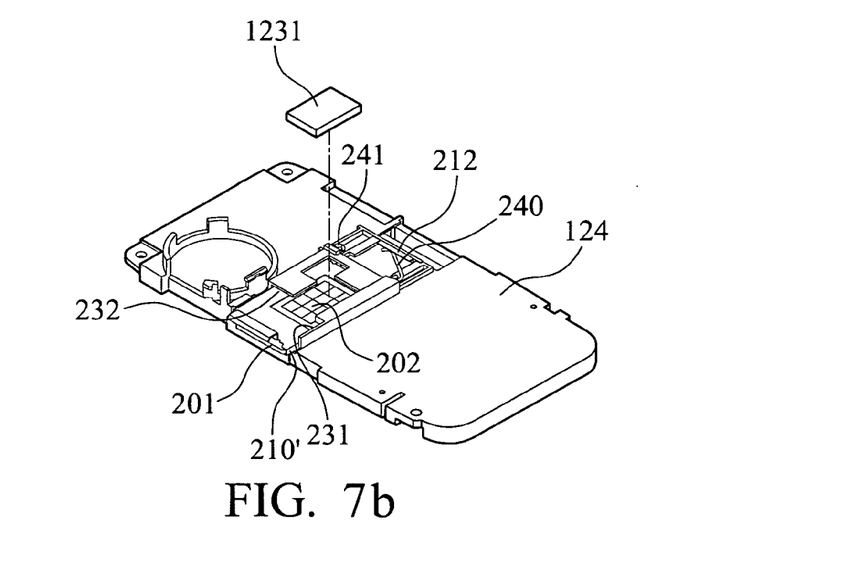

FIG. 7b is an assembly view of the modified embodiment in FIG. 7a, wherein the coupling portion 1231 passes the through hole 214, and couples the conductive portion 202 of the SIM card.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A card-receiving device for containing a card, comprising:
   a chassis having a first position and a second position;
   a tray, disposed on the chassis and moveable between the first position and the second position of the chassis, wherein the card is disposed on the tray, and moves from the second position to the first position with the tray;
   a resilient member, connected to the chassis and the tray and generating an elastic force when the tray leaves the second position; and
   a stopper, disposed on the chassis, wherein when the tray moves to the second position from the first position by the elastic force, the stopper abuts the card and stops the card from moving with the tray.

2. The card-receiving device as claimed in claim 1, wherein the stopper is a cantilever beam, comprising a stopping portion disposed on an end thereof, and when the tray moves to the second position from the first position, the stopping portion abuts and stops at a side of the card.

3. The card-receiving device as claimed in claim 1, wherein the chassis comprises a guide groove, in which the tray unit slides.

4. The card-receiving device as claimed in claim 1, wherein the resilient member is disposed between the chassis and the tray, the resilient member comprises a first end and a second end, the first end is connected to the chassis, the second end is connected to the tray.

5. The card-receiving device as claimed in claim 4, wherein the resilient member is a metal stick disposed between the chassis and the tray, wherein when the tray moves to the second position, the metal stick is compressed and bended for storing elastic force.

6. An electronic device receiving a card, comprising:
   a housing, comprising an opening;
   a chassis, disposed in the housing; and
   a card-receiving device, disposed on the chassis, comprising a tray and a stopper, the tray supporting the card and moveable between a first position and a second position, wherein when the tray moves to the second position from the first position by an elastic force, the stopper abuts the card and stops the card from moving with the tray to eject the card partially from the opening.

7. The electronic device as claimed in claim 6, wherein the stopper is a cantilever beam, comprising a stopping portion disposed on an end thereof, and when the tray moves to the second position from the first position, the stopping portion abuts and stops the card.

8. The electronic device as claimed in claim 6, wherein the card-receiving device further comprises a guide groove disposed in the groove, and the tray unit slides in the guide groove.

9. The electronic device as claimed in claim 6, wherein the card-receiving device further comprises a resilient member, fixed on the chassis, connected to the tray, the resilient member comprising a first end and a second end, the first end connected to the chassis, the second end connected to the tray, and the resilient member moves the tray from a first position to a second position by the elastic force.

10. The electronic device as claimed in claim 9, wherein the tray is planar, comprising an abutting portion formed on a first side thereof, and the resilient member abuts the abutting portion.

11. The electronic device as claimed in claim 6, further comprising a display disposed on the chassis.

12. The electronic device as claimed in claim 6, wherein the chassis comprises a guide groove, in which the tray slides.

13. The electronic device as claimed in claim 6, wherein the stopper is disposed on the chassis.

14. The electronic device as claimed in claim 6, wherein the tray is planar, comprising a holding portion which is formed on a second side thereof and extending out of the opening.

15. The electronic device as claimed in claim 6, further comprising a circuit board, disposed in the housing, wherein the circuit board comprises a conductive portion, and the conductive portion couples the card.

16. The electronic device as claimed in claim 15, wherein the card is sandwiched between the circuit board and the tray, and the conductive portion contacts the card.

* * * * *